United States Patent [19]

Koziniak

[11] 4,384,622
[45] May 24, 1983

[54] IMPACT WRENCH WITH LINEAR MOTION HAMMER ADAPTER

[76] Inventor: Peter Koziniak, 2372 Recuerdo Cove, Del Mar, Calif. 92014

[21] Appl. No.: 94,842

[22] Filed: Nov. 16, 1979

[51] Int. Cl.³ .............................................. B25B 21/00
[52] U.S. Cl. .................................... 173/123; 173/117
[58] Field of Search ............... 173/123, 97, 109, 93.6, 173/117; 227/88

[56] References Cited

U.S. PATENT DOCUMENTS

| | | | |
|---|---|---|---|
| 3,256,946 | 6/1966 | Jansen et al. | 173/123 X |
| 3,268,014 | 8/1966 | Drew | 173/123 X |
| 3,280,921 | 10/1966 | Bickford | 173/123 |
| 3,322,208 | 5/1967 | Skoog | 173/123 |
| 3,837,410 | 9/1974 | Maxwell | 173/123 X |
| 4,082,152 | 4/1978 | Whitworth | 173/123 X |
| 4,232,750 | 11/1980 | Antipov et al. | 173/93.6 |

Primary Examiner—Henry Jaudon
Assistant Examiner—Andrew M. Falik
Attorney, Agent, or Firm—Duane C. Bowen

[57] ABSTRACT

Semi-automatic, powered nailing is provided preferably by power from a commercially available electric impact torque wrench. The wrench is fitted with a hammer mechanism converting wrench torque to hammer blows. The hammer provides power to a nail feeding mechanism. The nails are in strips in which the nails are in a series one behind another. The feeding mechanism severs the series of nails and/or completes the formation of nails. The nails preferably are formed by hollow tubing cut between nails defining a plurality of points therearound on one side of the plane of nail division and defining a plurality of head forming tabs therearound on the other side of the plane of nail division.

2 Claims, 20 Drawing Figures

IMPACT WRENCH WITH LINEAR MOTION HAMMER ADAPTER

BRIEF SUMMARY OF THE INVENTION

Background and Objectives

My invention pertains to a new integrated nailing system concerning all aspects of nailing, including the source of nailing power, the manner of feeding nails and the type of nails.

A preliminary examination search has been conducted. The searcher reported the following patents (on prior devices not previously known to me):

| | | |
|---|---|---|
| 3,943,782 | 3,788,403 | 3,910,324 |
| 3,930,927 | 3,623,646 | 3,246,528 |
| 3,023,628 | 2,421,474 | 4,111,347 |
| 2,830,294 | 3,334,624 | 2,812,526 |
| 341,413 | 182,495 | 2,913,204 |
| 162,643 | | |

I don't consider the invention defined by the appended claims to be shown by the foregoing patents or by any other prior nailing systems familiar to me.

Objectives of my invention include: to provide energy, material, money, and time saving nailing devices in all aspects of nailing including the source of nailing power, the manner of feeding nails, and the types of nails used. Another objective is to design such a nailing system that is satisfactory as to other nailing considerations such as strength, simplicity, adaptability and practicability.

My invention will be best understood, together with additional objectives and advantages thereof, from the following description and from the drawings.

It will be observed that all parts of my nailing system are related. I will discuss the system in the following order of partial divisions: power sources and hammer mechanism, nail feeding mechanism, and nailing strips.

Power Source and Hammer Mechanism

Figure 1:
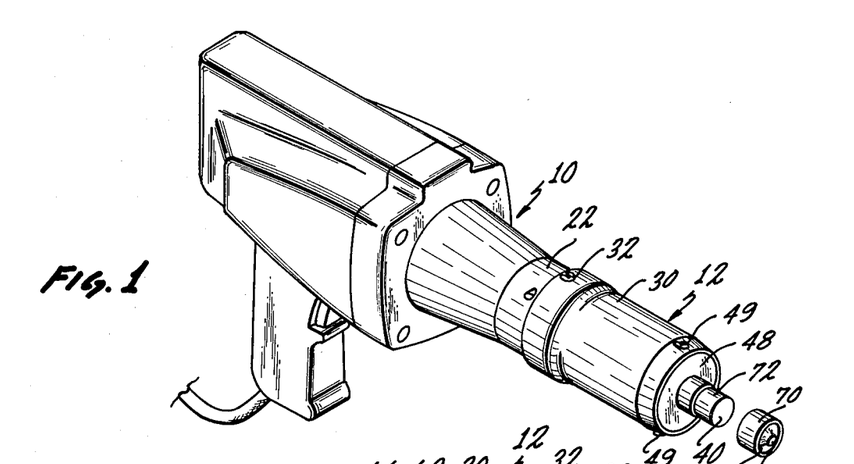
FIG. 1 is a perspective view of a commercially available electric impact torque wrench fitted with a hammer mechanism.

A commercially available electric impact torque wrench 10 is shown in FIG. 1 along with a hammer mechanism 12 installed thereon. A suitable example of such wrench 10, substantially as illustrated, is Sears Craftsman Electric Impact Wrench, ⅜" square drive, Model No. 315.18130, 110-120 60 HZ 3.2 Amps., 384 Watts, delivering 40 ft./lb. of torque in 5 seconds, no load speed of 1800 RPM, two impacts per revolution. Reasons to use such a wrench 10 as a source of power includes: reasonable price for the power source, relatively low weight (can be under 10#) for the amount of power, power variable by finger pressure, the favorable impact characteristics of the power source, utilization of commonly available 110 volt electric power, good efficiency in energy use. I do not mean to exclude possible use of impact wrenches otherwise powered or to exclude possible use of an electric drill motor as a power source, but the disadvantages of such substitutions will be understood, i.e., a source of pressured air often being unavailable in the former case, the lack of impact power characteristics in the latter case, etc.

Figures 2, 3, 6:
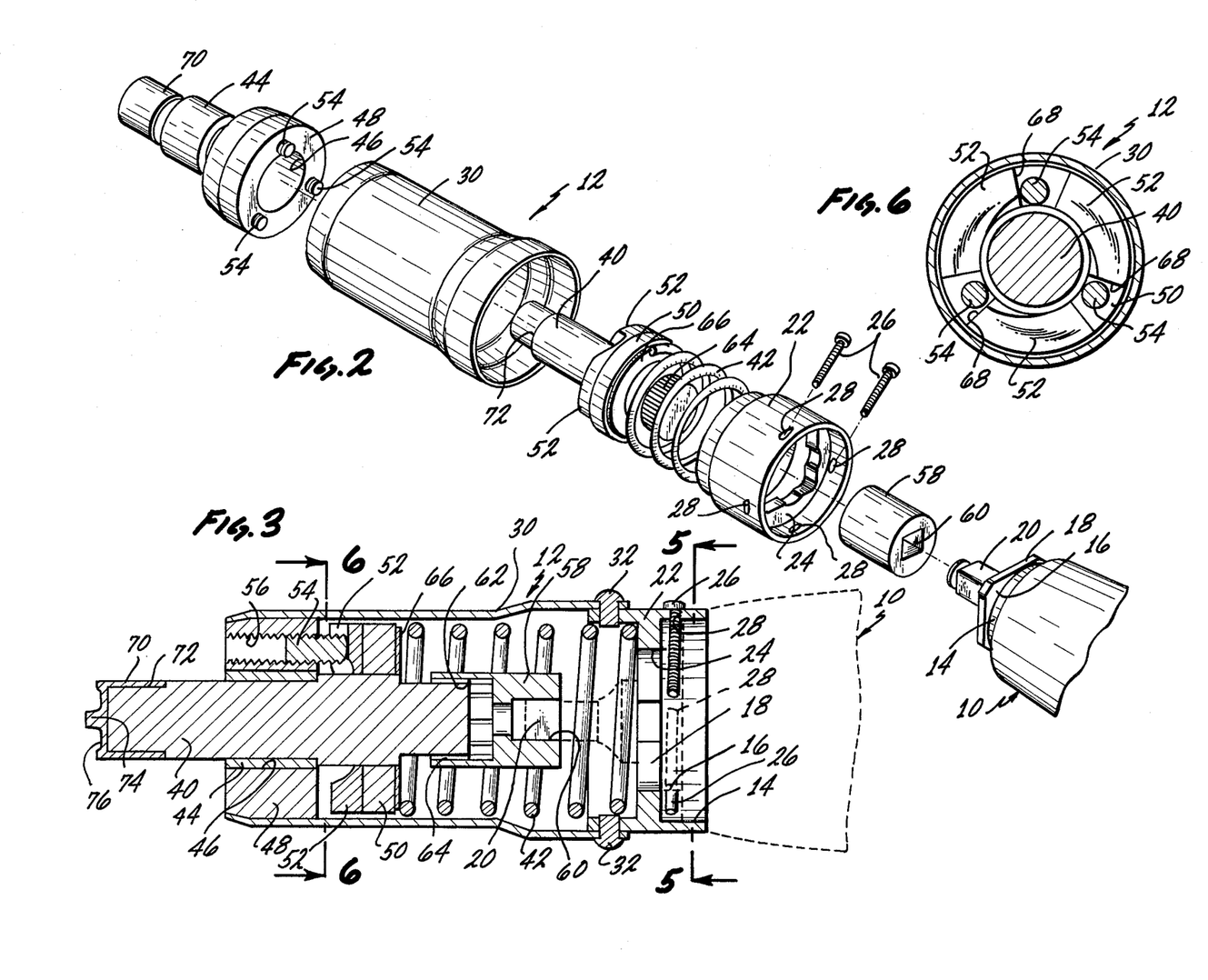
FIG. 2 is an enlarged, exploded perspective view of the hammer mechanism and a portion of the wrench.
FIG. 3 is an enlarged side view, primarily in section, of the hammer mechanism in which the hammer striking element is in extended, striking position. A portion of the wrench is shown in dashed lines.
FIGS. 5 and 6 are views taken primarily in section on lines 5—5 and 6—6 respectively of FIG. 3.
Figure 4:
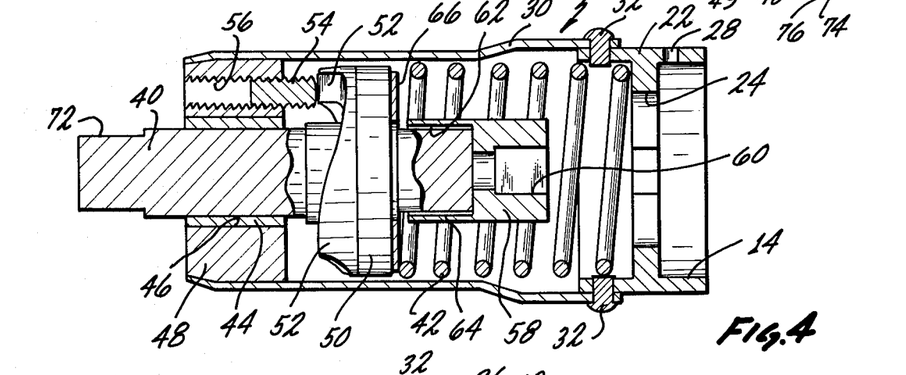
FIG. 4 views the hammer mechanism much like in FIG. 3 but with the hammer striking element in retracted, energy storing position.
Figure 5:
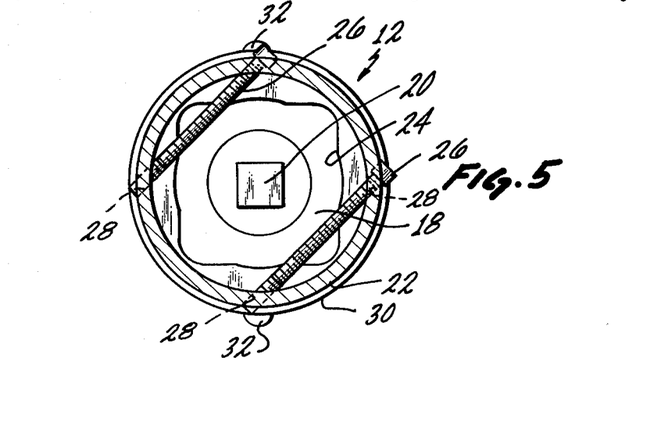

Type of mounting of hammer mechanism 12 on wrench 10 will differ according to the design of the mating end of wrench 10. In the case of wrench 10 as illustrated and described, the housing terminates serially in a reduced diameter circular seat 14, a circular groove 16 and a substantially squared flange end 18, around a squared output power shaft 20. Hammer mechanism 12 has an annular end fitting 22 that engages seat 14 at one end, has an interior squared flange 24 that fits squared flange wrench end 18, and is secured by a pair of pins, screws or the like 26 extending through openings 28 in fitting 22 and engaging circular groove 16. Fitting 22 is secured in an end of an annular hammer mechanism housing 30 by screws or rivets 32.

The function of hammer mechanism 12, as powered by electric wrench 10, is to strike with a hammer head element 40 in the manner of hammer blows, i.e., functionally like manually powered blows with a hand held hammer. To accomplish this function, hammer head 40 reciprocates rectilinearly in a cycle withdrawing inwardly and compressing a spring 42 and then being released and striking outwardly under the force of the energy stored in compression spring 42. Cam means are used to convert the torque of shaft 20 to force to move hammer head 40 against spring 42.

Hammer element 40 is slidably guided at its forward end by a brass sleeve bearing 44 inset in an opening 46 in a plug 48 appropriately secured, as by screws 49, in the forward end of housing 30. Secured to hammer element 40 is an annular cam plate 50 having preferably three cams 52 which coact with three pins 54 threadedly secured in opening 56 in plug 48. Connector 58 has at its rear end a square opening 60 engaged with the squared end of power shaft 20 and connector 58 has at its forward end interior splines 62 engaged with exterior splines 64 on the rear end of striking element 40. Compression spring 42 fits between end fitting 22 and cam plate 50 (actually, there is a brass washer 66 between spring 42 and cam plate 50 so that spring 42 will not bear directly on the rotating plate 50). This means that as power shaft 20 rotates, cam plate 50 will rotate, moving cams 52 relative to pins 54, causing hammer element 40 to reciprocate as spring 42 is alternately compressed and released.

Cams 52 are suitably shaped and gradually rise until the high point 68 is reached, whereupon the cams end abruptly to release spring 42 to drive hammer element 40. About ¼" cam rise, about a 3:1 mechanical advantage, and about a 290# compression spring operated suitably in a prototype. Coacting fully defined cams or cam followers can be substituted for pins 54.

The structure and operations of the elements depicted in FIGS. 1-6 have been described above, with one exception. That exception, which will be better understood in connection with the hollow nail depicted in FIGS. 11-16, concerns the nail head engaging and forming thimble 70 fitting on a reduced diameter end section 72 of striking element 40. The thimble 70 has a central portion 74 fitting in the center of a tubular nail and has a curved camming annular medial portion 76 to engage tabs of such nail to bend them to engage the surface of the workpiece when the tubular nail is driven. Thimble 70 is installed on hammer head 40 when a hollow nail is to be driven.

It will be understood that hammer mechanism 12 is adapted to give powered hammer blows at a rate and force level controlled by the impact wrench 10 used, by the value of compression spring 42, and by the geometry of cams 52 and associated parts. An example of rates and force levels are a reciprocating impact force longitudinally of approximately 424 lbs. at a rate of 15 impact per second with a longitudinal stroke of approximately 0.25 inches. At full torque, the cited torque wrench 10 is capable of developing a compression load in the spring of approximately 1200 pounds when cam surfaces 52 provide a mechanical advantage of approximately four, with an impact stroke of about 0.25 inches.

Nail Feeding Mechanism

FIGS. 7 to 10 show a mechanism 100 for feeding nails of the types shown in FIGS. 11-19, which is mounted on and powered by the power source and hammer mechanism detailed in FIGS. 1-6.

The mounting of the nail feeding mechanism 100 on wrench 10 and hammer mechanism 12 will differ depending on the type of impact wrench 10 procured, depending on the configuration of hammer mechanism 12 and the type of connection to wrench 10 required or preferred, and depending on the design of base of mechanism 100, etc.

In the drawings, I show an elongated trough base 102 of a v-shaped cross-section that is secured to wrench 10 by bolt 104 secured in a threaded opening in wrench 10.

The force required to operate nail feeding mechanism 100 comes from hammer mechanism 12, by means hereafter to be described. For the present, let it be said that the force is applied to push rod 106 slidably mounted to an opening 108 in a forward mounting pad 110 appropriately secured to trough base 102. The force is applied rearwardly against the pressure of a compression spring 112 which acts between pad 110 and a flange 114 on push rod 106.

The rear end of push rod 106 is appropriately secured to a cam member 120 with a rearwardly facing conical cam bore 122. Cam member 120 thus moves under the urging of push rod 106.

In series rearwardly from cam member 120 are three cam segments 124, a motion transfer barrel 126, an interference chuck 128, and an aft mounting pad 130 which is appropriately fixedly secured to trough base 102.

Guided passage of a nail strip through the above sequence of parts is provided by a tubular nail guide 132 secured in a bore 134 in aft mounting pad 130, the central through cavity 136 in interference chuck 128, a bore 138 in motion transfer barrel 126, and a hollow bushing 140 secured in a bore 142 in forward mounting pad 110 and having a rear annular shoulder 144 providing a stop both for cam segments 124 and for the smaller of two bores 146, 148 in cam member 120.

A hollow tubular nail strip 200 is shown in FIGS. 7-10 having a series of hollow tubular nails 202 dividing adjacent nails into a series of points 220 therearound on the forwardly facing side of the plane of division and into a series of head forming tabs 230 on the rearwardly facing side of the plane of division.

The action of parts 106-148 is as follows. Push rod 106 is forced rearwardly against the resistance of compression spring 112. Rod 106 moves cam member 120 rearwardly and interior conical cam bore 122 acts against cam segments 124 to force them radially inwardly to act on nail strip 200. Strip 200 has been preformed (as will be later explained) with points 220 and tabs 230 largely formed but having at least one bridging web between the adjacent series of points 220 and series of tabs 230 to maintain nails 202 joined in a strip and to maintain some degree of stiffness therebetween to tend to hold the series of nails 202 in a straight line. Cam segments 124 have severing and forming ends 149 acting to sever such web or webs and preferably to further bend tabs 230 outwardly.

Figures 7, 7A:
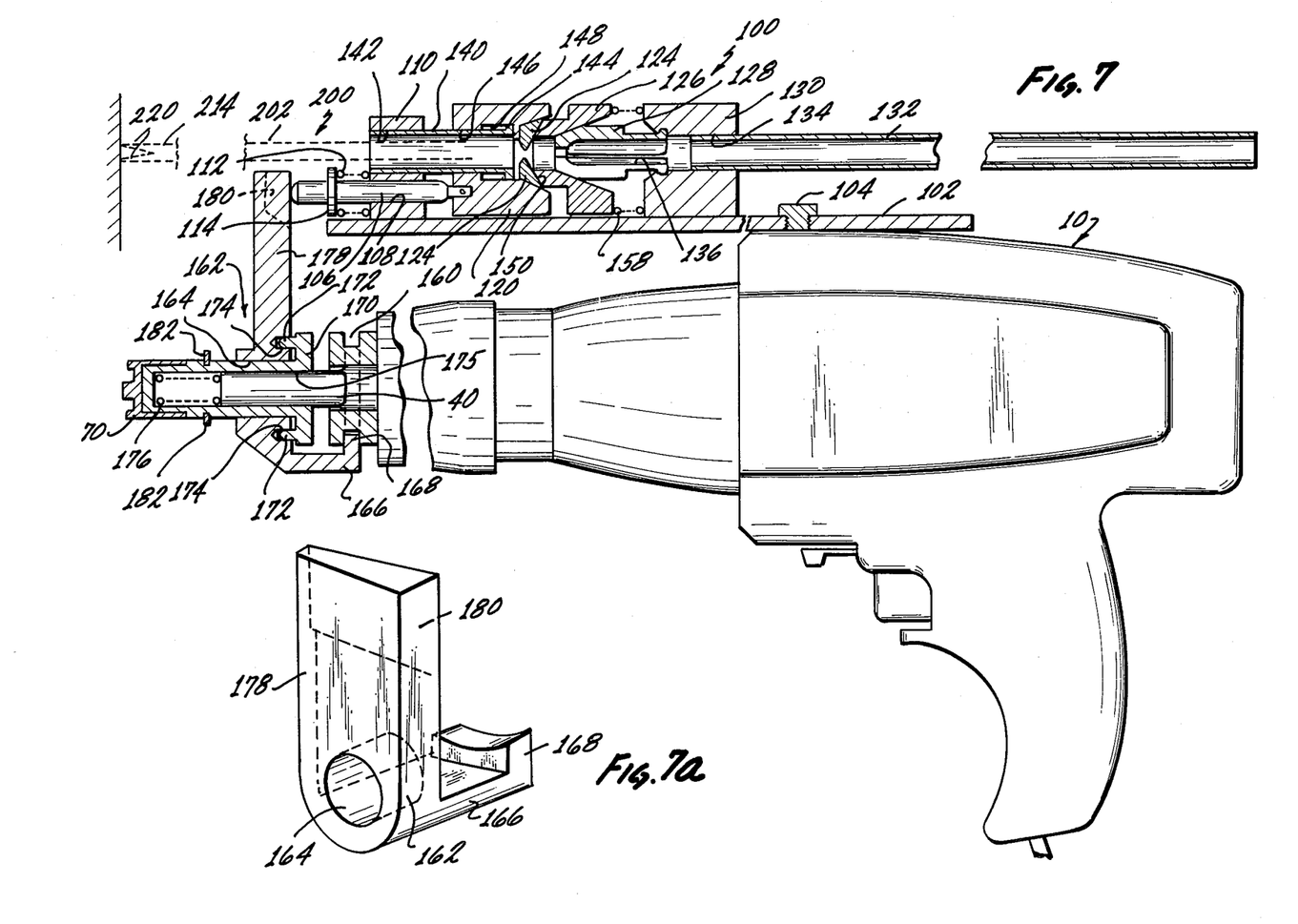
FIG. 7 is a side view, partly in section, showing a nail feeding mechanism mounted on the torque wrench and hammer mechanism shown in FIGS. 1-6. The mechanism is shown in the process of setting a nail into a workpiece.
FIG. 7a is a perspective view of a part of the FIG. 7 assembly.
Figure 8:
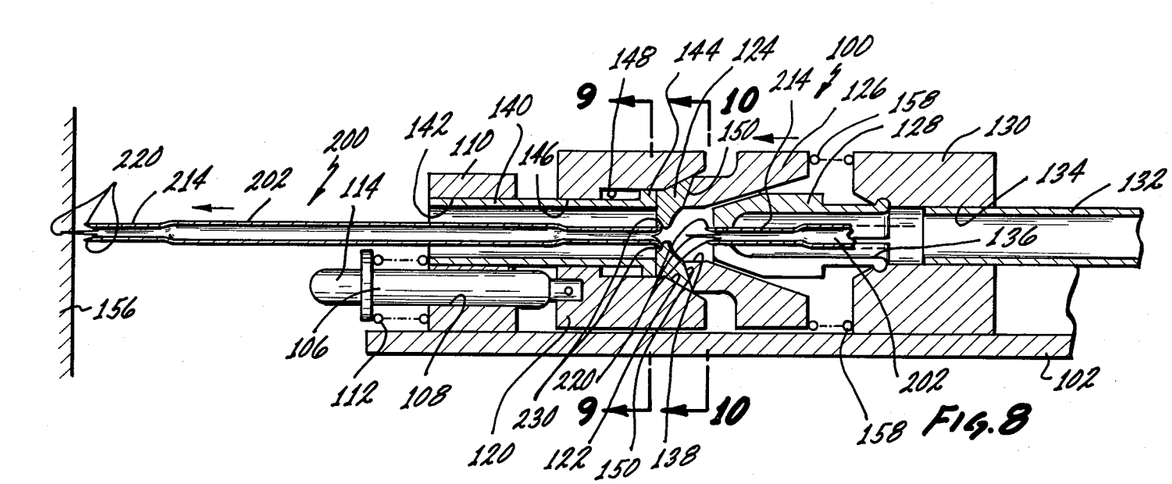
FIG. 8 shows the nail feeding mechanism similarly to the showing in FIG. 7, but is on enlarged scale and includes portions of a nailing strip.
Figure 9:
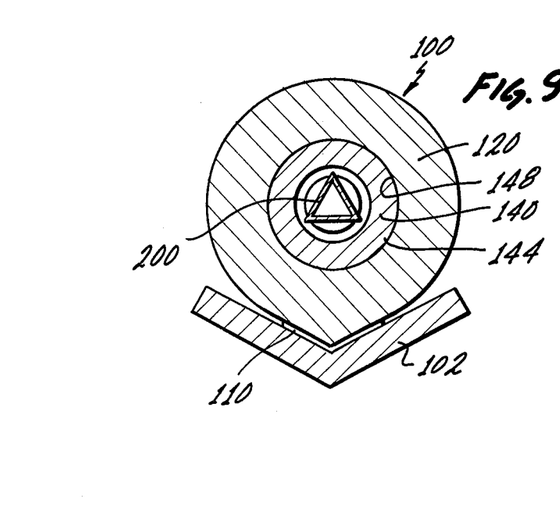
FIGS. 9 and 10 are views taken primarily in section on lines 9—9 and 10—10 respectively of FIG. 8.
Figure 10:
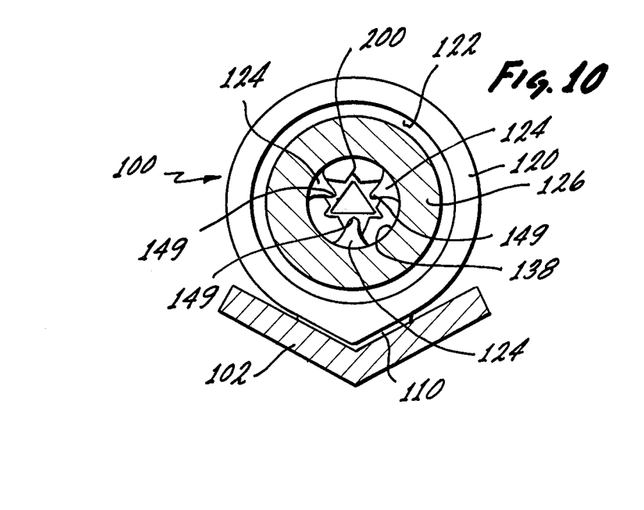

It may be observed from FIGS. 7 and 8 that portion 150 of the rearwardly facing sections of cam segments 124 are conically configured. Conical surface 150 reacts with the conical surface at the forward end of motion transfer barrel 126 and with the planar rear surface of the shoulder 144 of bushing 144. The forward end of motion transfer barrel 126 is also acted upon by conical bore 122 of cam 120 providing an aft force on barrel 126.

The inner aft surface of barrel 126 is also conical with a shallow taper to produce a high mechanical advantage, whereby as barrel 126 is forced rearwardly, the rear conical surface of barrel 126 acts on the forward conical surface of chuck 128 to close chuck 128 on nailing strip 100. Interference chuck 128 has three segments which are separate or are joined only at their rear ends so that the forward ends can be inwardly bent. In any case, the rear end of chuck 128 has a flange 152 secured in a groove 154 in bore 134 in aft pad 130.

When the assembly is relaxed (push rod 106 is in forward position), the segments of chuck 128 are spread, permitting advancement or insertion of nailing strip 200, i.e., chuck 128 not interfering with the passing of strip 200. However, when the assembly is compressed, i.e., the conical rear end of motion transfer barrel 126 acts to pinch the forward ends of the segments of interference chuck 128, the closing action of chuck 128 acts on nail strip 200 to secure it in place. Actually, the portion of nail strip 200 acted upon by chuck 128 and cam segments 124, has been preformed into generally equilateral triangular cross-section, which is complementary to the three segments each of cams 124 and chuck 128. This portion of strip 200 of triangular cross-section is especially evident in FIGS. 9 and 10. A portion of the nail guiding structure described may act on the triangular cross-section to index it into proper relationship relative to the severing and forming points 149 on cam segments 124.

When chuck 128 has been closed, further rearward force by push rod 106 applied to cone cam 120 produces a forward motion on cam segments 124 by means of the tapered combination between cam segments 124 and barrel 126. The forward motion of cam segments 124 provides the initial driving force to set the points 220 of the forward-most nail 202 into the workpiece 156. After the forward-most nail 202 has been set in workpiece, then the hammer head element 40 or the thimble 70 (FIGS. 1-6) can be used to drive the nail the rest of the way into the workpiece 156, without further use of nail feeding mechanism 100.

When push rod 106 is allowed to return forward under the urging of compression spring 112, cam 120 can return forward and the segments of interference chuck 128 can expand thereby releasing nail strip 200, whereupon nail strip 200 can be manually advanced to put the next nail 202 in position to be set in a workpiece 156 and to be severed from the next subsequent nail 202 by means of forming and severing ends 149 of cam segments 124.

Spring 158 is necessary to retain cam segments 124 in position (without other keeping mechanisms) and also to help the segments separate apart from each other in that part of their cycle. When spring 112 pushes button 106 forward, its travel is greater than is necessary to separate segments 124. The separation of segments 124 is caused by the push of spring 158 and the coned surfaces of segments 124 and barrel 126.

Means forming a part of tubular nail guide 132 or otherwise provided in the assembly can insure that the portions 214 of strips 200 of triangular cross-sections are clocked properly for engagement of ends 149 of cam segments 124 behind nail tabs 230.

The drawings show two versions of hammer mechanism 12. The first has been illustrated in FIGS. 1-6 and has been described above. The second version is shown in FIGS. 7 and 7a. The two configurations are alike internally but differ as to hammer head element or spindle 40 and as to providing a grooved end 160 on plug 48. This means that a hammer can be provided as illustrated in FIGS. 1-6 that will drive nails in general or will drive nails 202, 302 in particular. If it is desired to transfer motion or force to mechanism 100, then a configuration like FIGS. 7 and 7a will be needed. Marketing considerations, of course, will determine whether two versions of hammer mechanism 12 are produced or whether the more versatile FIGS. 7 and 7a structure only will be produced that either can be used to feed and set nails with mechanism 100 or can be used to drive nails of common types or of the types 202, 302 illustrated herein.

An operating member 162 has a smooth bore 164 and has a retainer 166 with a finger 168 engaging in groove 160 of plug 48. A clutch 170 has an external cylindrical surface received in bore 164 to rotatably mount operating member 126. Clutch 170 has pins 172 engaging with openings 174 in member 162 so that clutch 170 and operating member 162 will rotate together when pins 172 are engaged in openings 174.

Clutch 170 is bored at 175 from one end and a compression spring 176 is interposed in bore 175 between its end and a reduced diameter end on spindle 40. This means that pins 172 of clutch 170 will be engaged with openings 174 of operating member 162 except when pressure is applied on the end of clutch 170 to disengage the same, which will occur when the hammer mechanism 12 shown in FIGS. 7 and 7a is used to drive a nail. Note that the same type of thimble 70 can be used to drive nails 202 as was provided on spindle 40 in the FIGS. 1-6 construction.

Clutch 170 is slidable axially of spindle 40 but is suitably secured against relative rotation, which can be provided by a number of expedients such as by providing a Number 33 Jacobs taper for frictional drive, providing a key or spline, by squaring spindle 40 or otherwise giving it a polygonal cross-section, or by using some other suitable expedient. A retaining ring 182 is provided to retain operating member 162 on clutch 170.

From the foregoing it will be understood that operating member 160 rotates with spindle 40 when wrench 10 powers hammer mechanism 12 except when the left end of clutch 170 as viewed is pressed inwardly against spring 176 during driving of a nail by thimble 70. Operating member 160 has a radial arm which may have at its end a width of about an inch and a half, for example, in a direction lateral of arm 178 and in a plane perpendicular to the axis of spindle 40. In other words this width is in the direction of rotation of arm 178 and the end of arm 178 is configured as a cam 180. This means that in each rotation of arm 178 of operating member 162 that push rod 106 of nail feeding mechanism 100 is cammed to the right as viewed by cam 180, to thereby cause the operations of nail feeding mechanism 100 above described.

Nail Structure

Figures 11, 12:
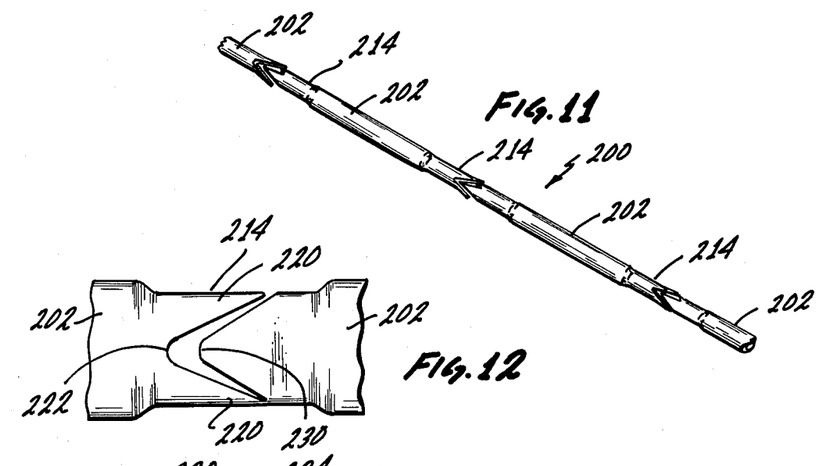
FIG. 11 is a perspective view of portions of a strip of nails formed from hollow tubing.
FIG. 12 is an enlarged, partial side view of a section of the strip shown in FIG. 11 in which the hollow tubing used to form the strip is cut between nails defining a plurality of points therearound on one side of the plane of nail division and defining a plurality of head forming tabs therearound on the other side of the plane of nail division.

FIG. 11 shows a portion of a nail strip 200 which is made up from a series of nails 202 secured together in a straight strip. The number of nails to be secured together is partly a matter of choice and partly a function of size, i.e., there will be more nails per lineal foot if each nail is equivalent to an 8 penny nail than if each nail is equivalent to a 16 penny nail, etc.

One of my concepts is to make each nail 202 of closed tubular form, i.e., to make nails 202 from tubular stock. Both experiments with prototypes and analytical data appear to indicate the following advantages with nails 202 as illustrated and described, as compared with conventional nails, etc.:

(a) Tubular nails are more economical to produce than conventional nails. For a 0.250" diameter hollow core nail in low alloy steel or 2024-T3 Al. Aly., for examples, net reduction in cross-sectional area indicates a saving of around 43.6% of material according to one analysis. Reduced energy is required to fabricate tubular nails in similar proportions.

(b) Tubular nails can be satisfactorily formed from aluminum, whereas aluminum has not proven satisfactory in solid nails. Selection of the proper aluminum alloy of course is important, i.e., Al. Aly. is a feasible selection but not the Al. Aly. 5052 H series or any of the work hardenable Al. Aly. alloys.

(c) The tubular nails are more economical to use in terms of energy or labor. Powered nail driving is feasible to save labor.

At present it is thought that about a 0.125" diameter may be the smallest practical tubular nail size.

A number of configurations were investigated and the type of end treatment illustrated in the drawings was the best of those examined as to ease of workpiece penetration, avoidance of nail failure, etc. In the area of joinder between nails 202, the preferably normally cylindrical stock has been formed into generally an equilateral triangle in cross-section. A minimum wall thickness of 0.022" was selected, i.e., some hollow nails were fabricated from SAE 1018 material with 0.250" outside diameter, 0.022" wall thickness, and 0.206" inside diameter. It will be understood that a long process will be involved to select the best steel or aluminum alloys for tubular nail fabrication, to arrive at final sizes, and to develop the best tubular cross-section, the best nail points, the best nail head construction, etc. The present standard nail was developed over many decades. Therefore, although I believe I have designed improvements in nails, I think final specifications will be arrived at over a period of years. For example, if an equilateral nail cross-section is used in whole or in part, this would only be an equilateral triangle in a general sense and the walls 210 would not necessarily be straight and the corners 212 would be more or less radiused.

The portions 214 of strip 200 of triangular cross-section are preferably spaced therealong, although recognizably strip 200 could be entirely of triangular cross-section or it would be possible to form nails 202 while maintaining a cylindrical shape.

As a consequence of the choice of a triangular nail cross-section 214, three nail points 220 are formed, at the corners 212 of the cross-section, with grooves 222 therebetween in walls 210. Points 220 may be described as radially spaced around the cross-section of each nail 202. It could be stated in reverse of the above that the selection of three points resulted in the triangular cross-section, rather than vice versa, which would mean that with other polygonal cross-sections, other numbers of points 220 could be used. Note if a cylindrical cross-section were preserved with a single point, the nail would tend to tip in driving, two points would be less balanced and stable than three points (similarly to the logic of a three-legged stool), etc.

On the opposite side of the (irregular) plane of cutting to separate adjacent nails 202 from the nail pointing configuration just described is the nail head forming configuration of the adjacent nail 202 which may be described as tabs 230 separated by grooves 232 therebetween. As implied by the name, a tab 230 can be blunted for its head-forming function, but tab 230 could merely have whatever shape functions best for grooves 222 between points 220. Preferably during forming of strip 200, tabs 230 are outwardly bent to a degree, as indicated at 234 in FIG. 13. Such outward bending 234 is the first step in preferably an outward bending of around ninety degrees to ultimately lie flat on the surface of the workpiece 156 or to cinch into the surface of workpiece 156. One of the functions of thimble 70 (FIGS. 1 and 2) is to support the head of a nail 202 as it is being hammered or driven into a workpiece 156. The central thimble portion 74 fits withing the tubular nail shape and the curved camming annular medial portion 76 acts on the several tabs 230 to further bend them during nail driving and to flatten tabs 230 against the face of workpiece 156 or to actually cinch tabs 230 into the surface of workpiece 156.

The feeding of nailing strip 200 by nail feeding mechanism 100 already has been explained, together with the initial setting of nails 202 in workpiece 156 with mechanism 100. Then each nail can be driven the rest of the way by hammer head element 40, with or without use of thimble 70.

Figures 13, 14, 15:
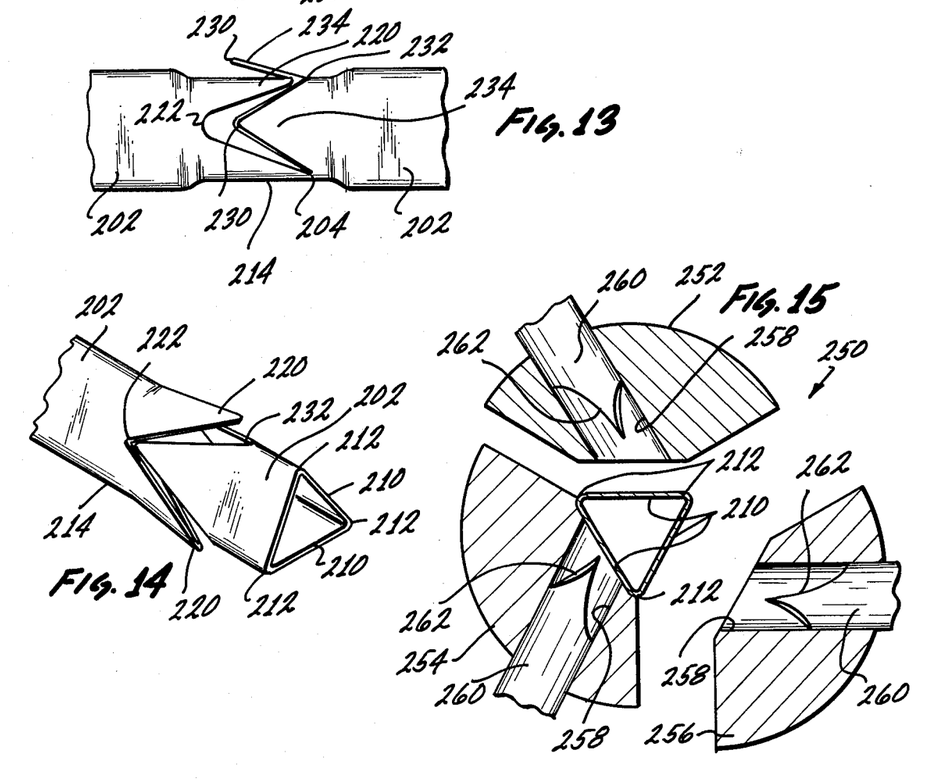
FIG. 13 is like FIG. 12 except the nailing strip has been rotated.
FIG. 14 is like FIGS. 12 and 13 except being a perspective view.
FIG. 15 is a view, partly in section, of means to separate the nailing strip into nails by forming such points and tabs.

Nails 202 are maintained connected in series and maintained in relatively straight disposition in nail strip 200 by leaving one or more webs 240 connecting adjacent nails 202, as depicted in FIG. 13. Such web or webs can be severed by the cutting edges 149 of cam segments 124 in nail feeding mechanism 100.

It will be understood that nails 202 or nail strips 200 can be formed in a number of ways with different tools. I have illustrated one applicable process and illustrated one basic type of tooling in FIGS. 15 and 16. A three-part die 250, with sections 252, 254, 256, is shown closing about the nail or nailing strip in FIGS. 15 and 16. The nailing strip can be formed into a generally triangular cross-section either with die 250 or in a previous forming operation.

Each die section 252, 254, 256 has a through bore 258 in which is disposed a rod-shaped tool 260 with a cutting end 262 designed so that the three cutters 262 as they are forced inwardly through the metal of strip 200 (FIG. 15-16 sequence) sever the metal to form nail points 220, grooves 222, tabs 230, grooves 232, and webs 240 and, also, preferably bend tabs 230 outwardly somewhat, i.e., 10 degrees.

Figures 16, 17, 18:
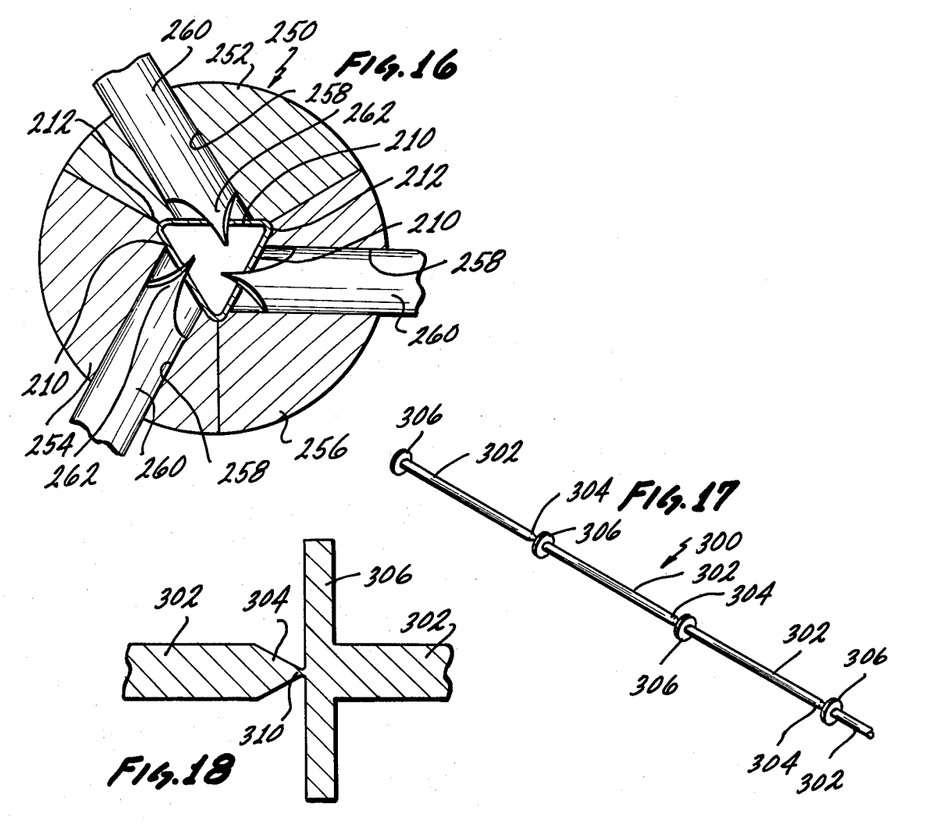
FIG. 16 is like FIG. 15 but shows the nail forming process further along in nail forming sequence.
FIG. 17 is a view like FIG. 11 but of modified form in which the nailing strip is made of solid material.
FIG. 18 is an enlarged sectional side of a portion of FIG. 17 wherein nail points and heads meet and are integrally joined.
Figure 19:
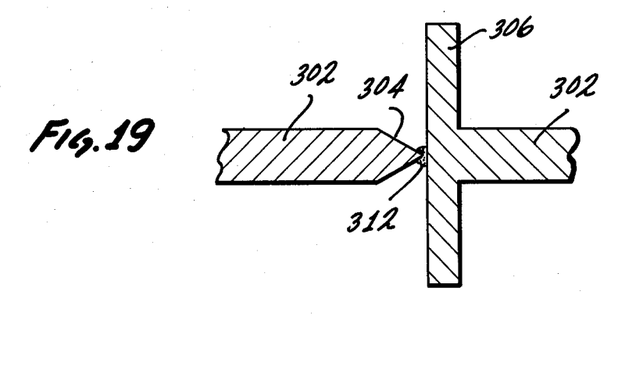
FIG. 19 is like FIG. 18 except adjacent nails are bonded together.

FIGS. 17-19 illustrate a different solid nail strip 300 formed by a series of solid nails 302 that may be of conventional type except for joinder of points 304 to heads 306. Joinder of nails may be achieved by an integral web 310 (FIG. 18) or by bonding, spot welding, etc., as shown by web 312 (FIG. 19). Impact welding is preferred.

The solid nail strip 300 can be fed by the same nail feeding mechanism 100 as used with hollow nail strip 200 or with the substitution of modified parts or with a different nail feeding mechanism. If the same nail feeding mechanism 100 is used as shown in FIGS. 7-10, severing ends 149 of cam segments 124 should be adapted to sever webs 310, 312 but not to interfere with heads 306.

Returning to a description of the hollow nails 202, FIGS. 11-14 show outward bending of tabs 230, and points 220 could also be outwardly tipped if so desired. Those skilled in the arts of tooling and metalforming will recognize the considerations involved in determining the alignments of points and tabs, i.e., there is normal springback in working even flat metal and in this case there will be additional metal stresses due to working of the metal in changing the normal cylindrical tube contour to the portions 214 of triangular cross-sections. The length of points 220 (from tips to bottoms of grooves 222) is preferably 1.5 to 2.0 times the original tube diameter in the configuration shown. Tube section 214 is preferably 2.0 to 2.5 times original tube diameter in the configuration shown.

Having thus described my invention, I do not wish to be understood as limiting myself to the exact details shown but instead wish to cover those modifications thereof that will occur to those skilled in the art upon learning of my invention and which are properly within the scope of my invention.

I claim:

1. A hammer, comprising:
   (a) an electrically powered impact torque wrench having an output driver and a wrench housing thereabouts, said driver rotating relative to said wrench housing,
   (b) an adapter including an adapter housing secured to said wrench housing against separation and against relative rotation,
   (c) said adapter including a hammer head and said adapter housing supporting said hammer head to reciprocate in a linear path of travel toward and away from said driver,
   (d) said adapter including a spring acting between said hammer head and said adapter housing to move said hammer head away from said driver whereby said hammer head will strike a blow if it is moved towards said driver against the force of said spring and released,
   (e) said adapter including cam means acting during rotation of said driver to move said hammer head towards said driver and then to release the same, and
   (f) said adapter housing including an annular end plug opposite to said wrench slidably guiding said hammer head and said plug having a plurality of openings and said cam means including a first set of cam elements in the form of pins each having an end threadedly engaged in said openings whereby said plug supports said first set of cam elements, said hammer head having secured thereto an annular cam plate with a second set of cam elements formed therein facing said first set of cam elements which engage therewith whereby as said cam plate rotates relative to said pins said hammer head is repeatedly moved towards said driver and then released, said hammer head having external splines at its end towards said driver and a connector connecting between said driver and said hammer head by having internal splines at one end engaged with said external splines of said hammer head and means at the other end of said connecter engaging said driver to secure said driver and said connecter to rotate together, said internal and external splines permitting said hammer head to reciprocate towards and away from said driver while rotating said hammer head with said driver.

2. The subject matter of claim 1 in which said plug has a brass sleeve bearing guiding said hammer head, said wrench housing having at its end towards said adapter housing a squared flange end and an annular groove inside of said squared flange and an annular fitting having an interior squared flange fitting said squared flange end of said wrench housing and a pair of pins extending through said annular fitting and into said annular groove whereby said annular fitting is fixedly secured to said wrench housing, said adapter housing being secured to said annular fitting, and said spring being a compression spring disposed about said hammer head and said connector and bearing on said annular fitting and said cam plate.

* * * * *